United States Patent
Rui et al.

Patent Number: 5,877,414
Date of Patent: Mar. 2, 1999

[54] VEHICLE ROAD LOAD SIMULATION USING EFFECTIVE ROAD PROFILE

[75] Inventors: Yuting Rui, Ann Arbor; Fayyaz Saleem, Taylor; Jianhua Zhou, Ann Arbor, all of Mich.

[73] Assignee: Ford Motor Company, Dearborn, Mich.

[21] Appl. No.: 893,753

[22] Filed: Jul. 11, 1997

[51] Int. Cl.$^6$ .................................................. E01C 23/00
[52] U.S. Cl. ................................................................ 73/146
[58] Field of Search ................................. 73/146, 8, 660, 73/669, 670, 862.043, 865.6

[56] References Cited

U.S. PATENT DOCUMENTS 5,610,330  3/1997  Fricke et al. ............................... 73/146

OTHER PUBLICATIONS

K. Lucas, G. Kafetzis and W. H. Dunn, "Standardisation of Road Profiles for Tire Coupled Road Simulators", C427/21/179, Rover Group Ltd. (No date).

S. Lu, "Standardized Road Exciting Spectrum and Vibration Analysis of Vehicles", SAE 891369 (No date).

D. Negrut and J. S. Freman, "Dynamic Tire Modelling forApplication with Vehicle Simulations Incorporating Terrain", SAE 940223 (No date).

P. R. Pierce, "Using Simulkated Road Surface Inputs for Dynamic Analysis of Heavy Truck Combination Vehicles", SAE 820096 No date.

Y. Kondo, M. Kato and H. Sugi, "Prediction Methods of Rough–road–Load Applied to Vehicle Body", SAE 900665 (No date).

T. Mimuro, T. Maemura and H. Fujii, "Development and Application of the Road Prodile Measuring System", SAE 930257 (No date).

H. Hanselmann, "Hardware–in–the–loop Simulation as a Standard Approach for Development, Customization, and Production Test", SAE 930207 (No date).

Yuting Rui, F. Saleem, J.H. Zhou, "Road Load Simulation Using Effective Road Prodile", SAE 971512 (No date).

A. Rupp and V. Grubisic and J. Neugebauer, Developmetn of a Multi–Component Wheel Force Tranducer—A Tool to Support Vehicle Design and Validation, SAE 930258 (No date).

*Primary Examiner*—William Oen
*Attorney, Agent, or Firm*—David B. Kelly

[57] ABSTRACT

A method and system for generating an effective road profile for use with a computer aided vehicle design system is disclosed. The method has the steps of developing a vehicle model for a vehicle is developed and then excited with an initial drive file to produce a vehicle model response. The vehicle model response is compared to a desired response to produce an error signal, the desired response being based on vehicle dynamics data from a vehicle when driven over a road surface. A modified error signal is determined using a vehicle response model, and the modified error signal is fed into the vehicle model to produce a vehicle model response. A new error signal is iteratively determined until it is within a predetermined limit to produce a vehicle model effective road profile. Once the effective road profile has been determined, a modified vehicle model is excited with the effective road profile to produce a modified model response. The modified vehicle can thus be tested without need for a prototype. Various vehicle model parameters are graphically displayed, as are the vehicle model responses, so that a vehicle designer may interactively change the vehicle model or other parameters.

20 Claims, 4 Drawing Sheets

VEHICLE ROAD LOAD SIMULATION USING EFFECTIVE ROAD PROFILE

FIELD OF THE INVENTION

The present invention relates to vehicle testing in general, and more specifically to computer vehicle model testing and road load simulation.

BACKGROUND OF THE INVENTION

It has long been desirable for automotive vehicle designers to develop a computer based model to define the dynamic behavior of an automotive vehicle. A computer based vehicle model, typically designed with a computer-aided engineering (CAE) system, is valuable to provide vehicle design testing and analysis prior to making a prototype. This vehicle model evaluation, for example durability and NVH testing, can save the time and expense of building several prototypes before a final design is achieved.

An important part of vehicle durability and NVH testing is accurate road load testing. Prior attempts at modeling a vehicle for computer simulated road load testing have generally been unsuccessful, including attempts at providing a "virtual proving ground". In particular, a satisfactory tire model for use in a vehicle model has been difficult to achieve since a tire model which accurately models a tire has been found to be computationally inefficient and unstable, while a simpler tire model does not accurately predict road loads. The problem is exacerbated when a tire model is used in conjunction with a vehicle model which may have inherent errors due to modeling assumptions.

SUMMARY OF THE INVENTION

The present invention overcomes the above noted problems by providing a vehicle model testing method and system which develops an effective road profile for the vehicle model. Vehicle dynamics data, a system frequency response function, and a simplified vehicle dynamics model are used to generate the effective road profile. In the method, a vehicle model is excited with a drive file to produce a vehicle model response. The vehicle model response is compared to a desired response to produce an error signal, the desired response being based on vehicle dynamics data collected from a vehicle when driven over a road surface. A modified error signal is then determined using a vehicle frequency response function, and the modified error signal is fed into the vehicle model to again produce a vehicle model response. The comparison between the vehicle model response and the desired response is iteratively performed until the error signal is within a predetermined limit, thus producing a vehicle model effective road profile. The effective road profile can then be used with a modified vehicle model to produce a modified model response for vehicle model testing and road load simulation, and for predicting road loads during simulated vehicle testing.

An advantage of the present invention is a method and system for generating an effective road profile from a CAE vehicle model which allows expedited testing without the need for physical prototypes.

Another advantage is a method for using an effective road profile developed from a first vehicle model to perform road load testing on a second vehicle model.

Yet another advantage is the ability to produce reliable and accurate vehicle road load simulation with simple vehicle models and tire models by using predetermined vehicle response control points and an effective road profile determined from the control points.

Still another advantage of the present invention is computational efficiency achieved by using a tire model with an effective road profile in vehicle road load simulation.

Yet still another advantage is a method which allows use of a variety of tire models.

BRIEF DESCRIPTION OF THE DRAWINGS

These and other objects, advantages, and features of the present invention will be apparent to those skilled in the art upon reading the following description with reference to the accompanying drawings, in which.

DETAILED DESCRIPTION OF THE PREFERRED EMBODIMENT

Figure 1:
FIG. 1 is a diagram of a pair of vehicles being driven over a proving ground road surface.
Figure 2:
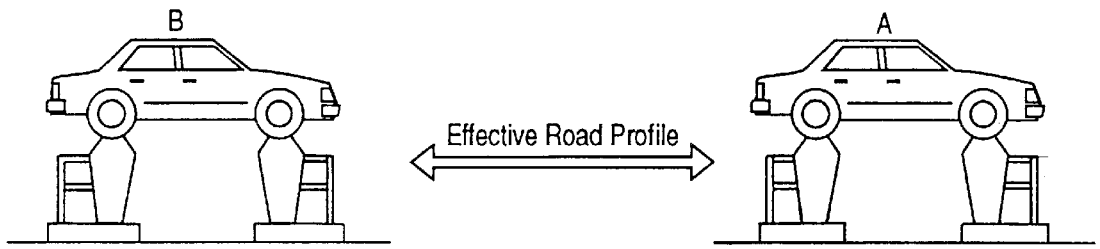
FIG. 2 is a diagram of an effective road profile used for cross-vehicle testing on a spindle-coupled simulator.

Turning now to FIG. 1 of the drawings, a typical proving ground durability test is shown for two vehicles, designated A and B, with different body, chassis, and/or engine configurations. Tire movement at a contact tire patch between the tire and road is bounded by the road terrain. For a spindle coupled simulator, there is no actual tire attached to the vehicle being tested. However, for illustrative purposes only, it can be imagined that tires are attached to the spindles of the simulator and that the inputs to the spindles are provided by tires which are running over the road. In such a case, the tire displacement at the tire patch must be same for each vehicle run over the road. If a "perfect" tire model were available for the vehicle tires, then a back-calculated road profile from spindle responses of each test vehicle would be the same for each vehicle A and B, except when the tire is off the ground (FIG. 2).

However, it has been found that the direct use of a geometric road profile to provide input into a vehicle model fails, partially due to shortcomings of the tire model. In particular, most tire models do not accurately model an actual running tire (FIG. 3a), the latter having uneven contact (FIG. 3b) instead of flat tire patch contact, tire enveloping effects (FIG. 3b), and rolling tire dynamics (FIG. 3c). One solution to the problem is to determine what excitations at an imaginary flap tire patch can produce the desired spindle loads and movements. For a given tire model, an effective road profile is defined as the displacement or load constraint at a tire patch which will produce desired spindle loads and movements which correspond to actual observed spindle loads and movements. There are vertical, longitudinal, and lateral components to an effective road profile.

VERTICAL EFFECTIVE ROAD PROFILE—In the vertical direction, the effective road profile for vertical direction is defined as the vertical displacement at the tire patch. For a three-dimensional system with spindle coordinates of $x_{sp}$, $y_{sp}$, $z_{sp}$, (FIG. 4), the total displacement $Z_p$ at a tire patch is $$Z_p = z_{sp} + d_{tire} \qquad (1)$$

where $d_{tire}$ is the tire deflection in the vertical direction. Once the tire deflection $d_{tire}$ is known, the vertical effective road profile can be calculated from equation (1). The tire deflection calculation $d_{tire}$ is further discussed below.

LONGITUDINAL AND LATERAL EFFECTIVE ROAD PROFILES—In the present invention, the longitudinal force on a tire has a component from dynamic displacement due to road terrain, as well as fore and aft driving force variations. The effective road profile for longitudinal direction can thus be written as $$P_x = a(w) X_{sp} + H_{tire}^{-1} F_x, \qquad (2)$$

where $a(w)$ is a constant which is a function of frequency, $w$, $X_{sp}$ is the spindle displacement relative to the vehicle rigid body movement in the longitudinal direction, $H_{tire}^{-1}$ is the inverse transfer function of the tire, and $F_x$ is load in the longitudinal direction. The first term in equation (2) is the longitudinal spindle displacement times a weight factor. The second term is the longitudinal tire deflection at the tire patch. When $a(w)=0$, the vehicles A and B have the same longitudinal force, thus amounting to force control. When $a(w)=1$, the vehicles have the same longitudinal displacement at tire patch, amounting to displacement control in which the spindle displacement equals the tire deflection. The constant $a(w)$ is determined by empirical means, and serves as weight factor between 0 and 1. If $a(w)X_{sp1}+H_{tire}^{-1}F_{x1}$ is the effective road profile in the longitudinal direction for Vehicle A, and $a(w)X_{sp2}+H_{tire}^{-1}F_{x2}$ is the effective longitudinal road profile for Vehicle B, then $$a(w) = \frac{(H_{tire}^{-1}F_{x1} - H_{tire}^{-1}F_{x2})}{(X_{sp1} - X_{sp2})} \qquad (3)$$

When $a(w)=1$, the effective road profile defined by equation (2) yields $$P_x = X_{sp} + d_{xtire} \qquad (4)$$

This is similar to the effective road profile in vertical direction defined by equation (1). When $A(w)=0$, the equation (2) yields by removing $H_{-1}$ $$P_x^* = F_x \qquad (5)$$

which means the loads in longitudinal direction for Vehicle A and B are unchanged.

To simplify the model of the present invention, the effective road profile for the lateral direction is assumed to be the same as defined for the longitudinal effective road profile.

TIRE MODEL AND TIRE DEFLECTION

The tire model used in the method and system of the present invention is preferably limited to radial direction with a flat tire patch contact. Two tire models which can be used are: (1). Tire model represented by Frequency Response Function and (2). Spring-Damper tire model.

The frequency response function of the tire was obtained by testing a tire on a tire test stand. The tire was preloaded to the static state of each wheel. Random white noise was then applied to the tire patch, and the frequency response function of the tire, H(w), was determined as follows:

$$H(\omega) = \frac{F(\omega)}{X(\omega)} \qquad (6)$$

where F(w) is the applied load and X(w) is the measured displacement.

A spring damper tire model was also evaluated and compared to the transfer function of the tire. It has been found that the load deflection curves for the frequency response function tire model was almost the same as the spring-damper tire model for load time histories of chuckholes, cobblestone and lowspeed track events. Thus, either tire model can be satisfactorily used with the present invention.

EFFECTIVE ROAD PROFILE USED IN LAB SIMULATION

Another challenge in determining road loads has been the difficulty in developing a road load vehicle model. In conventional vehicle testing, these road loads are input to the spindles of a road simulator. While load and displacement inputs to spindles change from vehicle to vehicle, a common connection between different vehicles is the road surface over which the vehicles are driven. A back-calculated road surface from spindle load and displacement will be generic if a "perfect" tire model is used. Due to the complexity of tire dynamics, such as tire enveloping effect, rolling stiffness and viscoelasticity etc., it is difficult to calculate exact tire deformation with present day models. If a simplified tire model is used, the inputs at tire patch can be calculated. A calculated history of displacement at a tire patch is called an Effective Road Profile, which creates the desired vehicle movements with a simplified tire model when input into a spindle-coupled simulator. Use of an effective road profile with a spindle-coupled simulator to test vehicles with configurations different from the vehicle used to develop the effective road profile was demonstrated in U.S. Pat. No. 5,610,330 (Fricke et al.), assigned to the assignee of the present invention and incorporated by reference herein.

CAE ROAD LOAD SIMULATION USING EFFECTIVE ROAD PROFILE

Figure 5:
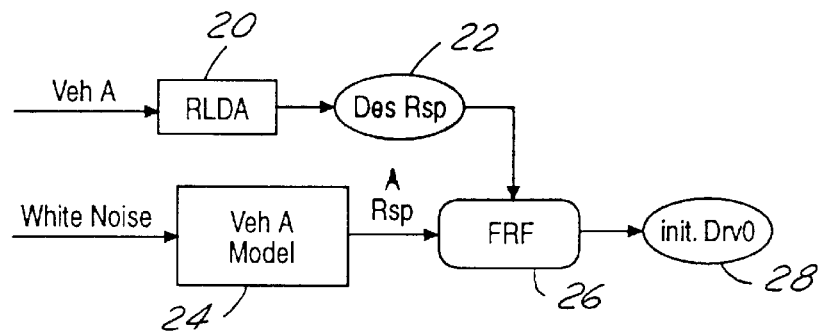
FIG. 5 is a flow diagram of a process for determining an initial drive file from a vehicle model and a frequency response function according to a preferred embodiment of the present invention.
Figure 6:
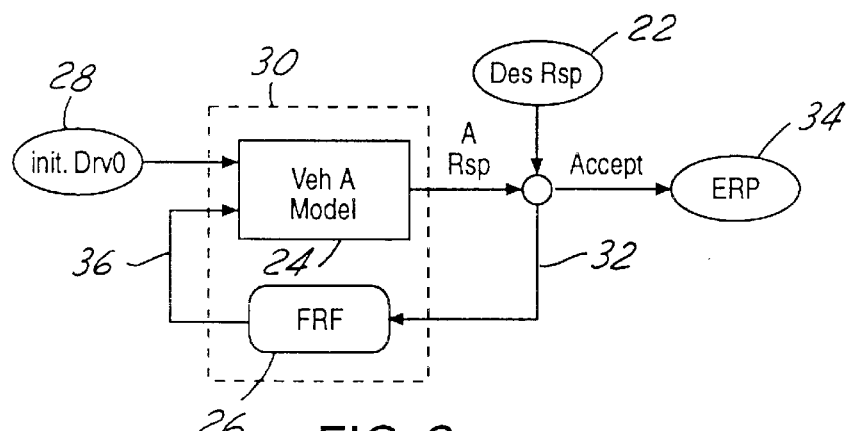
FIG. 6 is a flow diagram showing determination of an effective road profile for a vehicle model.
Figure 7:
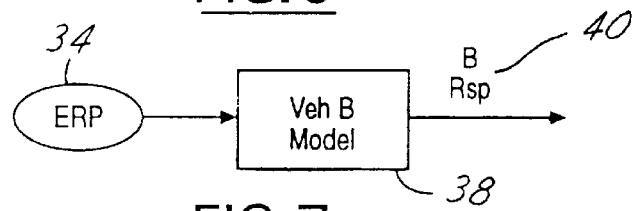
FIG. 7 is a flow diagram showing cross-vehicle usage of an effective road profile to produce a predicted vehicle response.

In the present invention, an vehicle model, for which road loads (desired responses) have been collected for an actual vehicle corresponding to the model, is used to calculate an effective road profiles. A preferred embodiment of the process is shown in FIGS. 5–7. Beginning in FIG. 5, a vehicle A is run over a test road surface, such as a road surface at a proving ground, and vehicle response data at predetermined control points is collected in box 20. The collected data is filtered, using techniques known to those skilled in the art, and edited to produce a desired response in ellipse 22. Next, random white noise is applied to a preselected model of vehicle A (box 24) which produces a vehicle A response, which are representative of vehicle A responses at predetermined control points. The vehicle A response and the random white noise input are used to obtain a frequency response function for vehicle A (box 26). The desired response (box 24) is fed into the frequency response function to produce an initial drive file (ellipse 28).

The initial drive file 28 is then fed into a composite model of vehicle A, represented by the dotted lines 30, and comprising the vehicle A model 24 and the frequency response function 26 (FIG. 6). Vehicle A response is determined and compared to the desired response 22. An error signal 32 is generated checked to see if is within a predetermined limit. If so, an effective road profile 34 has been determined. If the error signal is not within the predetermined limit, it is combined with the frequency response function 26 of the composite vehicle A model 30, and the resulting input signal 36 is fed into the vehicle A model 24 in conventional feedback fashion. The process is iteratively performed until the error signal is within the predetermined limit such that an effective road profile 34 is determined. The predetermined limit can be set, for example a ten percent limit, to provide accurate results.

Further testing of a modified vehicle A can then be performed without requiring actual road load testing, which is time consuming and expensive. It should be understood that the initial drive file is only fed into the vehicle A model once, and thereafter the input signal 36 is fed into the vehicle A model.

ROAD LOAD CALCULATION OF A NEW VEHICLE—Predicted road loads can be determined using the effective road profile 34, as seen in FIG. 7. A model for a new vehicle B (box 38) is developed and then excited using the effective road profile from vehicle A. Vehicle B responses 40 are determined, and the loads are analyzed for durability and NVH characteristics. It is important that the vehicle B model has the same model assumptions as the vehicle model from which the effective road profile was developed.

Figure 8:
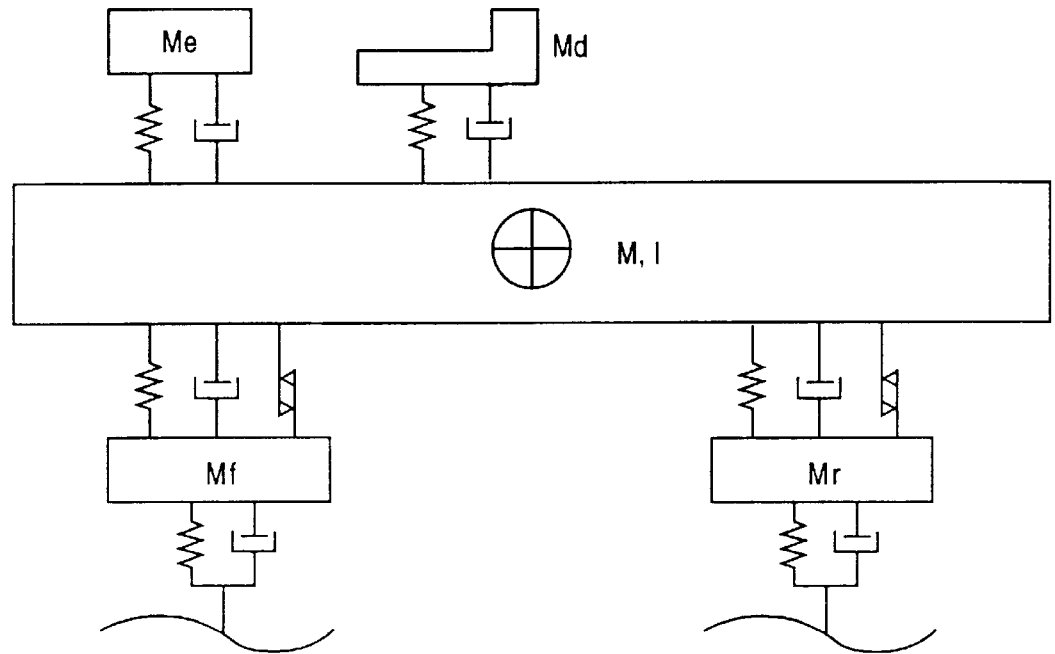
FIG. 8 is a schematic diagram of a vehicle model according to one aspect of the present invention.

VEHICLE AND TIRE MODELS—A six degree-of-freedom multi-rigid body dynamic model can be used as the vehicle model (FIG. 8). The degrees-of-freedom in the model are a forward unsprung mass ($M_f$), a rear unsprung mass ($M_r$), a vehicle mass (M), a vehicle inertia (I), a vehicle engine mass ($M_e$), and a vehicle driver mass ($M_d$). With this model, configuration variation between vehicles can be made, for example vehicle weight variation and suspension type. Those skilled in the art will appreciate that the present invention is not limited to six degrees-of-freedom, but can have more or fewer degrees-of-freedom. Effectively, other vehicle components can be added to the vehicle model. In addition, the model can developed with commercially available vehicle dynamics software, such as ADAMS and DADDS.

Figure 3A:
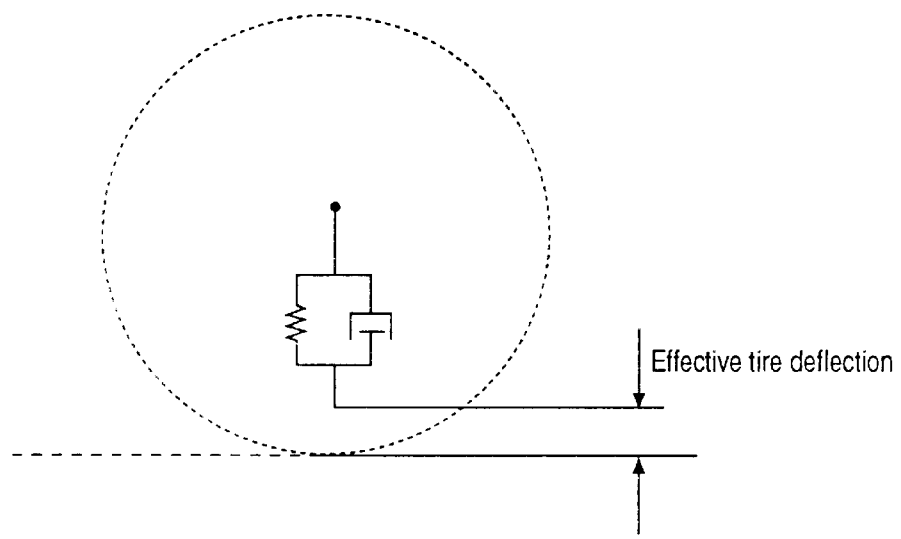
FIG. 3a is a schematic diagram of a simple spring-damper rolling tire model.
Figure 3B:
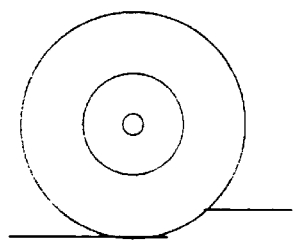
FIG. 3b is a side view of a tire rolling over an uneven surface.
Figure 3C:
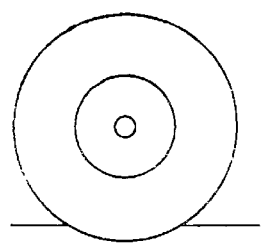
FIG. 3c is a side view of a tire indicating rolling tire dynamics.
Figure 4:
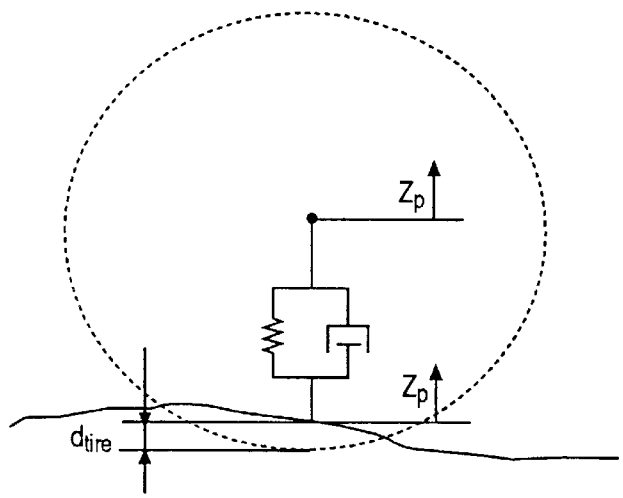
FIG. 4 is a schematic tire diagram of a spring-damper tire model showing components of the vertical effective road profile.

A simple spring-damper tire model can be used, such as that shown in FIGS. 3a and 4, since the effective road profile is not dependent on the accuracy of the tire model. In fact, one of the advantages of the present invention is the ability to accurately provide road loads to vehicle models without the need for a complex tire model. Other tire models known to those skilled in the art and suggested by this disclosure may also be used.

With the present invention, an effective road profile for a vehicle model can be determined with a simplified vehicle dynamic model, a system frequency response function, and a CAE program. The effective road profile can subsequently be used with a modified vehicle model, or with a new vehicle model, to provide predicted road loads and durability test analysis without building a vehicle prototype.

Figure 9:
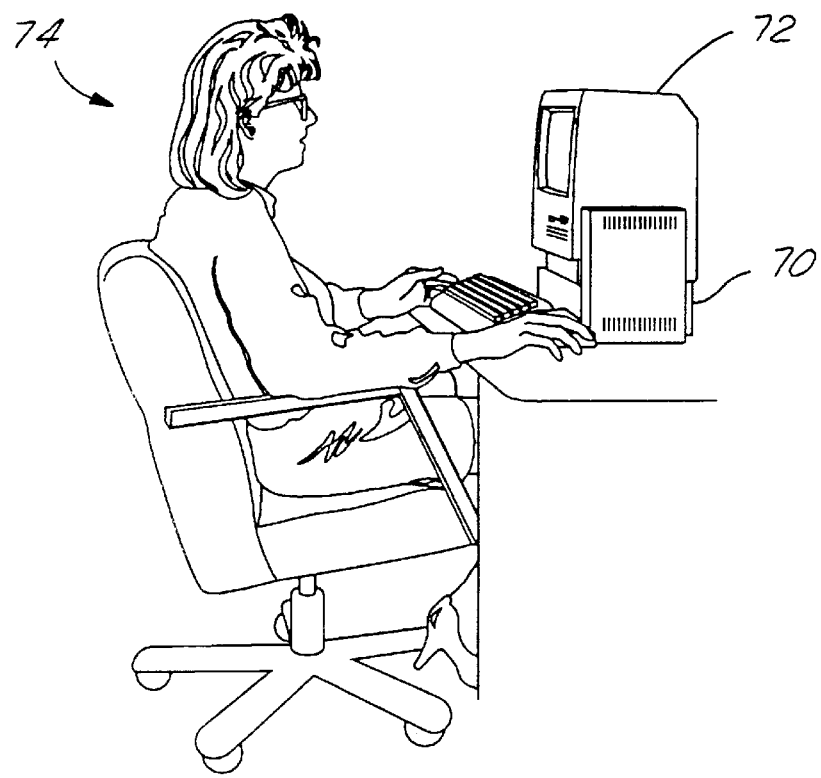
FIG. 9 is a perspective view of an operator using the present invention.
Figure 10:
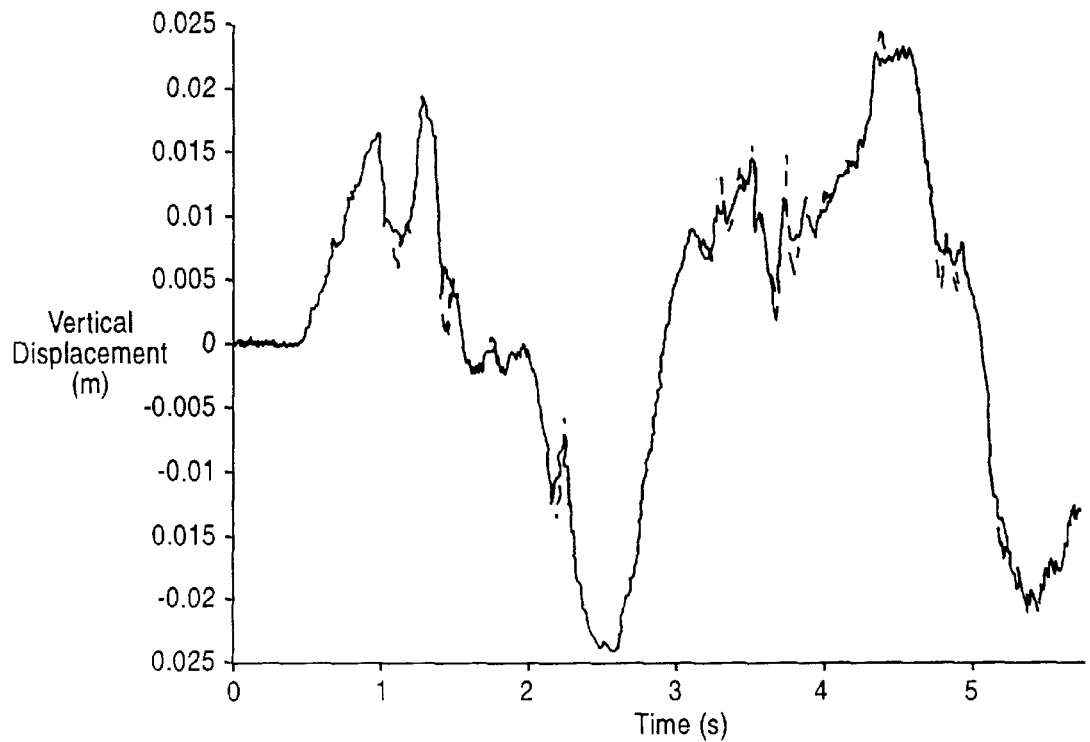
FIG. 10 is a graph showing predicted vertical displacement for a vehicle model based on effective road profile input into the model.
Figure 11:
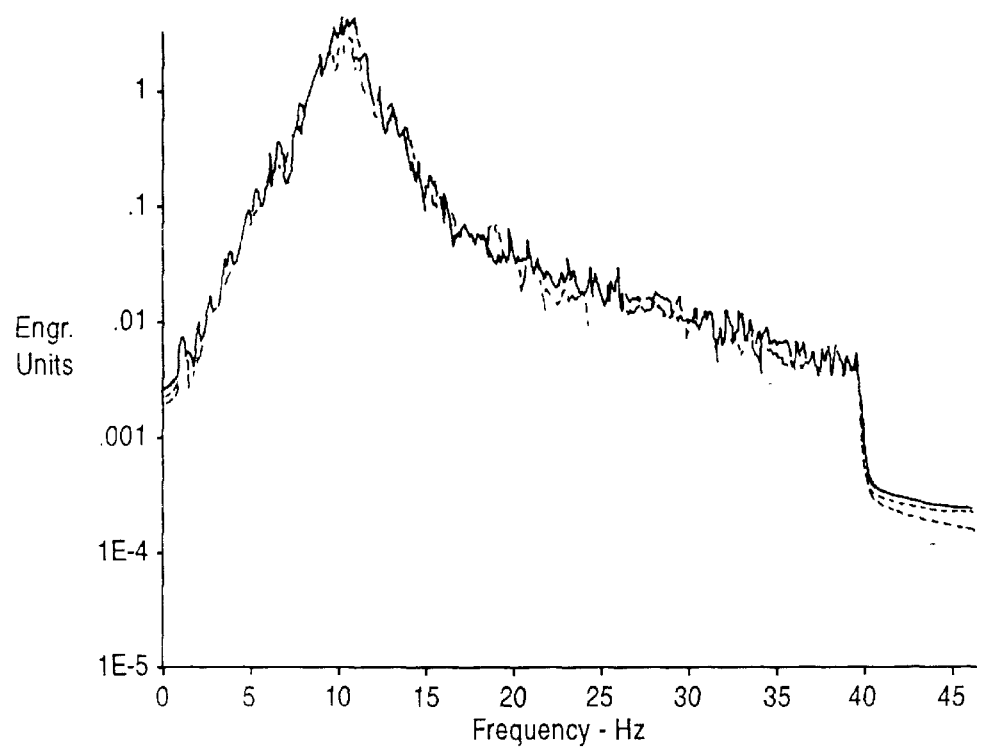
FIG. 11 is a graph showing predicted energy for a vehicle model based on effective road profile input into the model.

In a preferred embodiment of the present invention, portions of the method can be carried out on an electronic computer 70, having a monitor 72, by an operator 74 (FIG. 9). A dynamics computer program, for example Ride-6, can be used to simulate vehicle dynamics and a spindle-coupled simulator test. Other computer programs, such as Matlab subroutines, can be used to perform various numerical calculations, including frequency response functions, effective road profiles, statistics, error corrections, displacements (FIG. 10), power spectral densities (FIG. 11), and the iteration process. These can be displayed on the monitor 72 in the fashion shown in FIGS. 10–11 so that the operator may determine how to change the vehicle model, response functions, or the like.

Although the preferred embodiment of the present invention has been disclosed, various changes and modifications may be made without departing from the scope of the invention as set forth in the appended claims.

We claim:

1. A method for generating an effective road profile for use with a computer aided vehicle design system, the method comprising the steps of:
   (a) exciting a vehicle model with a drive file to produce a vehicle model response;
   (b) comparing the vehicle model response to a desired response to produce an error signal, the desired response based on vehicle dynamics data from a vehicle when driven over a road surface;
   (c) determining a modified error signal with a vehicle response model and feeding the modified error signal into the vehicle model to produce a vehicle model response; and
   (d) performing steps (b) and (c) until the error signal is within a predetermined limit to produce a vehicle model effective road profile.

2. A method according to claim 1 wherein the vehicle response model is a frequency response function developed from the vehicle model.

3. A method according to claim 1 wherein the vehicle dynamics data is obtained from a vehicle when driven over a road surface.

4. A method according to claim 3 wherein the desired response is developed from the vehicle dynamics data.

5. A method according to claim 4 wherein the drive file is developed from the desired response and the vehicle response model.

6. A method according to claim 1 wherein the vehicle model has six degrees-of-freedom.

7. A method for generating an effective road profile for use with a computer aided vehicle design system, the method comprising the steps of:
   (a) developing a vehicle model for a vehicle;
   (b) exciting the vehicle model with an initial drive file to produce a vehicle model response;
   (c) comparing the vehicle model response to a desired response to produce an error signal, the desired response based on vehicle dynamics data from a vehicle when driven over a road surface;
   (d) determining a modified error signal with a vehicle response model and feeding the modified error signal into the vehicle model to produce a vehicle model response; and
   (e) performing steps (c) and (d) until the error signal is within a predetermined limit to produce a vehicle model effective road profile.

8. A method according to claim 7 wherein the vehicle response model is a frequency response function developed from the vehicle model.

9. A method according to claim 7 wherein the vehicle dynamics data is obtained from a vehicle when driven over a road surface.

10. A method according to claim 9 wherein the desired response is developed from the vehicle dynamics data.

11. A method according to claim 10 wherein the drive file is developed from the desired response and the vehicle response model.

12. A method according to claim 7 wherein the vehicle model has six degrees-of-freedom.

13. A method for testing an automotive vehicle design using a computer aided engineering vehicle model and an effective road profile, the method comprising the steps of:
   (a) collecting a set of vehicle dynamics data from a vehicle when driven over a road surface;
   (b) developing a vehicle model for the vehicle including a vehicle response model;
   (c) exciting the vehicle model with a white noise to produce an initial model response;
   (d) generating an initial drive file based on the initial model response and a desired response based on the vehicle dynamics data;
   (e) generating an effective road profile for the vehicle model based on the vehicle dynamics data by:
      (i) exciting the vehicle model with the initial drive file to produce a vehicle model response;
      (ii) comparing the vehicle model response to the desired response to produce an error signal;
      (iii) combining the error signal with the vehicle response model and feeding a combination into the vehicle model to produce a vehicle model response; and
      (iv) performing steps (e)(ii) and (e)(iii) until the error signal is within a predetermined limit to produce a vehicle model effective road profile; and
   (f) exciting a modified vehicle model with the vehicle model effective road profile to produce a modified model response.

14. A method according to claim 13 wherein the vehicle response model is a frequency response function developed from the vehicle model.

15. A method according to claim 13 wherein the vehicle dynamics data is obtained from a vehicle when driven over a road surface.

16. A method according to claim 15 wherein the desired response is developed from the vehicle dynamics data.

17. A method according to claim 16 wherein the drive file is developed from the desired response and the vehicle response model.

18. A method according to claim 13 wherein the vehicle model has six degrees-of-freedom.

19. A vehicle model testing system for testing an automotive vehicle design using a computer aided engineering vehicle model and an effective road profile, the system comprising:
   (a) a vehicle model for a vehicle;
   (b) means for exciting the vehicle model with an initial drive file to produce a vehicle model response;
   (c) means for comparing the vehicle model response to a desired response to produce an error signal, the desired response based on vehicle dynamics data from a vehicle when driven over a road surface;
   (d) means for determining a modified error signal with a vehicle response model and feeding the modified error signal into the vehicle model to produce a vehicle model response;
   (e) means for performing steps (c) and (d) until the error signal is within a predetermined limit to produce a vehicle model effective road profile; and
   (f) means for exciting a modified vehicle model with the vehicle model effective road profile to produce a modified model response.

20. An article of manufacture comprising:
   a computer usable medium having computer readable program code means embodied therein for causing an effective road profile to be generated from a computer aided vehicle model, the computer readable code means in said article of manufacture comprising:
   (a) computer readable program code means for causing a computer to develop a vehicle model for a vehicle;
   (b) computer readable program code means for causing the computer to excite the ve cle model with an initial drive file to produce a vehicle model response;
   (c) computer readable program code means for causing the computer to compare the vehicle model response to a desired response to produce an error signal, the desired response based on vehicle dynamics data from a vehicle when driven over a road surface;
   (d) computer readable program code means for causing the computer to determine a modified error signal with a vehicle response model and to feed the modified error signal into the vehicle model to produce a vehicle model response; and
   (e) computer readable program code means for causing the computer to perform steps (c) and (d) until the error signal is within a predetermined limit to produce a vehicle model effective road profile.

* * * * *